(12) United States Patent
Williams

(10) Patent No.: US 7,882,361 B2
(45) Date of Patent: Feb. 1, 2011

(54) METHOD AND SYSTEM FOR ACCEPTING A PASS CODE

(75) Inventor: Emrys Williams, Bucks (GB)

(73) Assignee: Oracle America, Inc., Redwood City, CA (US)

(*) Notice: Subject to any disclaimer, the term of this patent is extended or adjusted under 35 U.S.C. 154(b) by 1096 days.

(21) Appl. No.: 10/773,069

(22) Filed: Feb. 5, 2004

(65) Prior Publication Data
US 2005/0177522 A1 Aug. 11, 2005

(51) Int. Cl.
*H04L 9/00* (2006.01)
(52) U.S. Cl. ............................................. 713/185
(58) Field of Classification Search ......... 713/182–185, 713/171, 172, 193; 726/2–10
See application file for complete search history.

(56) References Cited

U.S. PATENT DOCUMENTS

| | | | | |
|---|---|---|---|---|
| 5,023,908 A | * | 6/1991 | Weiss | 713/184 |
| 5,475,757 A | * | 12/1995 | Kelly | 713/159 |
| 5,557,676 A | * | 9/1996 | Naslund et al. | 380/247 |
| 5,666,415 A | * | 9/1997 | Kaufman | 713/159 |
| 5,721,779 A | * | 2/1998 | Funk | 713/155 |
| 6,026,293 A | * | 2/2000 | Osborn | 455/411 |
| 6,088,450 A | * | 7/2000 | Davis et al. | 713/182 |
| 6,209,102 B1 | * | 3/2001 | Hoover | 726/18 |
| 6,549,912 B1 | * | 4/2003 | Chen | 707/104.1 |
| 2002/0188872 A1 | | 12/2002 | Willeby | |
| 2004/0168083 A1 | * | 8/2004 | Gasparini et al. | 713/201 |

FOREIGN PATENT DOCUMENTS

| | | |
|---|---|---|
| DE | 101 16 567 | 10/2002 |
| EP | 564 832 | 10/1993 |
| GB | 2 313 460 | 11/1997 |

OTHER PUBLICATIONS

Combined Search and Examination Report under Sections 17 and 18(3) for Application No. GB0414697.3, mailed Oct. 11, 2004, 6 pages.

* cited by examiner

*Primary Examiner*—Beemnet W Dada
(74) *Attorney, Agent, or Firm*—Robert C. Kowert; Meyertons, Hood, Kivlin, Kowert & Goetzel, P.C.

(57) ABSTRACT

A method and apparatus for accepting a pass code such as a personal identification number (PIN) are disclosed. The method involves providing a user with a challenge, typically on some form of shielded display to prevent third party viewing. The user now enters a response which transforms the challenge into the pass code allocated to the user. The response allows the user to be validated against a stored record of the pass code allocated to the user.

52 Claims, 6 Drawing Sheets

METHOD AND SYSTEM FOR ACCEPTING A PASS CODE

FIELD OF THE INVENTION

The present invention relates to the acceptance of a pass code, such as for the validation of a personal identification number (PIN) in a credit card transaction.

BACKGROUND OF THE INVENTION

A pass code represents a string of symbols or characters for providing controlled access to a resource. A pass code is known to an individual or group of individuals authorised to access the resource. A copy of the pass code is stored in a security system that protects the resource. When an individual desires to use the resource, he or she enters the pass code into the security system, which checks that the entered pass code matches the stored pass code. Assuming that there is a match, the security system grants the user access to the resource.

FIGS. 1A, 1B, 1C, and 1D represent a variety of situations in which pass codes are used. In FIG. 1A, a user 101 enters a pass code into a terminal 110. Typically terminal 110 is provided with a keypad for this purpose, with the pass code comprising a short string of digits. Such terminals are frequently used to control access to buildings, car parks, and so on. Note that in many cases there is a single pass code that is shared by all users. This pass code is stored in the terminal, and the terminal compares the input from user 101 with the stored pass code in order to validate the user.

FIG. 1B illustrates a variation on FIG. 1A, where this time user 101 has a card 102 (and will therefore be referred to as card holder 101B). Card 102 may comprise a smart card with an embedded chip typically incorporating a processor and non-volatile storage. This non-volatile storage is used to hold a pass code in the form of a personal identification number (PIN) for card holder 101B.

In order to use terminal 110, card holder 101B typically engages card 102 into terminal 110, and then enters the PIN for the card. The terminal 110 forwards the user-entered PIN to the card 102, where it is compared to the PIN stored on the card. If there is a match, the card holder 101B is assumed to be properly authorised, and so the transaction is allowed to proceed.

Card 102 may be used in the configuration of FIG. 1B as a form of purse for payment purposes. One type of terminal 110 can be used to load the purse, by feeding cash into the terminal 110, with the cash then being loaded onto the card. Another form of terminal 110 allows purchases using card 102, where the terminal deducts money for a purchase from the balance on card 102.

FIG. 1C illustrates a configuration where terminal 110 is indicated as being a client system 110C connected by a network 120 to a server 130C. In one example, client system 110C may comprise a desktop personal computer. Network 120 can be any form of wired and/or wireless communications network, such as the Internet, a local area network (LAN), a wide area network (WAN), a mobile phone network, and so on.

The configuration of FIG. 1C might correspond to providing on-line access to an account held on server 130C, such as for email, home banking, Internet betting, and so on. Typically the account is accessed by user 101 providing a user ID to specify the particular account in question, and a pass code, which controls access to the specified account. The pass code is normally in the form of a password comprising an alpha-numeric string. The user enters the password into client 110C. The password is then transferred across network 120 to server 130, where it is compared against a stored password for the account. If a match is obtained, the server 130C allows the client 110C to manipulate the account, e.g. to read emails, transfer funds, etc, depending upon the nature of the account.

FIG. 1D illustrates a configuration where card holder 101D uses card 102 to access terminal 110, which in turn is linked to a server 130D via network 120. The configuration of FIG. 1D may correspond to a cash supply system, in which terminal 110 is an automated teller machine (ATM) connected via a private (secure) link 120 to server 130 that maintains account records for card holder 101D. It may also correspond to a conventional credit card purchase, where card 102 is a credit card, and terminal 110 is typically located in some merchant store. Terminal 110 is then connected over network 120 (which may be in the form of a dial-up link) to server 130D.

In one implementation of FIG. 1D, card 102 contains an identifier of user 101D, but not the pass code (PIN). Thus in use, card 102 is typically inserted into or swiped through terminal 110, which allows the terminal 110 to access the account number from card 102. The card holder 101D is then prompted to enter the PIN into terminal 110. The PIN and the account number are transmitted to server 130 for verification. Server 130 therefore confirms that the PIN entered by card holder 101D matches that stored in the server 130 in respect of the account identified by card 102. This model is generally used for ATM transactions.

In another implementation of FIG. 1D, the user pass code is stored on card 102 itself. In this case, the PIN entered by the user can be verified directly against the PIN stored on the card 102, in analogous fashion to that described above for FIG. 1B. Note that in this embodiment, the PIN need not be transferred to the server 130D, since the PIN authorisation has already been performed within card 102. Nevertheless, terminal 110 may still send the PIN to server 110, for example to provide an additional security layer against fraudulent use of card 102 (e.g. for audit purposes). The terminal 110 might also ask the server 130D to confirm that the account is still active (e.g. card 102 has not been stolen) and that the account has sufficient funds for the intended transaction (although this can be done without the server having to receive the PIN).

One risk with PINs and other forms of pass code is that they may be intercepted while being transmitted over a network 120. There is also a risk of interception between card 102 and terminal 110, especially bearing in mind that wireless links are sometimes used to transfer data between card 102 and terminal 110. Of course, an adversary may not initially understand the protocol used for such communications. However, if the same card 102 is used for many transactions, then it may become possible to determine or guess the PIN by looking for a repeated sequence in different communications.

One mechanism to protect pass codes is to encrypt messages in transit, such as over network 120 and/or between card 102 and terminal 110. Consequently, even if an adversary does manage to intercept the communications, this still does not divulge the pass code (assuming that the encryption algorithm is secure). One drawback however with encryption is that it generally requires both the sender and receiver to have knowledge of a key (or key pair) to be used for encrypting and decrypting the message. This may be difficult to arrange in situations such as shown in FIG. 1B, where a very large number of cards 102 and terminals 110 may be expected to interoperate in a heterogeneous environment.

A known technique for protecting pass codes in transit during authorisation is based on a challenge-response strategy. This strategy is illustrated in FIG. 2, for use in the general configuration of FIG. 1B. The processing of FIG. 2 starts when it is assumed that card 102 is brought into engagement with terminal 110, such as by insertion, proximity, swiping, or any other appropriate mechanism. This causes the card 102 to generate a challenge 210, which is typically a random (pseudo-random) number. Note that card 102 normally generates a fresh challenge for each new interaction (session) with terminal 110. Card 102 then transmits the challenge to the terminal 110 (step 215).

The terminal 110 now requests the card holder 101 to enter the PIN (step 220) (this request may be made before or after receipt of the challenge from the card 102). The card holder therefore enters his or her PIN, typically by pressing buttons corresponding to the PIN digits on a keypad (step 225). The terminal 110 now uses the PIN received from the card holder 101 as a key to encrypt the challenge received from the card 102 (step 230). This encrypted challenge forms the response, which is then sent by the terminal back to the card (steps 235, 245).

The card itself also encrypts the challenge that it sends to the terminal (step 240) (this encryption can be performed at any time after the challenge is first generated at step 210). The encryption is performed using a locally stored PIN on the card 102 as the key, and using the same encryption algorithm as used on the terminal to encrypt the challenge at step 230.

The card can now compare the response received from the terminal 110 with the encrypted version of the locally stored PIN (step 250). If the PIN entered by the card holder 101 at step 225 matches the locally stored PIN, then they will both produce the same outcome when encrypting the challenge. Accordingly, if a match is found at step 250, then the card holder is properly authorised to use card 102.

Note that the neither the transmission of the challenge from the card 102 to the terminal 110 (step 215) nor the return from the terminal back to the card of the response (steps 235, 245) has to be encrypted (i.e. they can be sent in plain or clear text). This is because even if an adversary does obtain both the challenge and the response, then it is still not possible to deduce the PIN stored on the card or the PIN entered by the customer (assuming a secure encryption algorithm is employed for generating the response). Moreover, because the card issues a different challenge for each new session, any response intercepted from a previous session cannot be used to validate a new session.

The skilled person will be aware of a wide range of variations on the particular challenge-response strategy illustrated in FIG. 2. For example, the strategy may be used in a wide variety of configurations (not just that of FIG. 1B). In addition, card 102 may decrypt the incoming response from terminal 110 using the locally stored PIN (or locally stored decryption key matching the PIN, depending upon the particular encryption algorithm employed). The decrypted response can then be compared to the challenge initially generated at step 210. A match indicates that the card holder 101 has entered the correct PIN (i.e. corresponding to that stored on card 102), and so is authorised to use the card.

Although a challenge-response strategy generally provides good protection for a pass code during communication, there is still a weakness at the point where the pass code is initially entered by the user (corresponding to step 225 in FIG. 2). One possible attack is to use a "sniffer" program that tracks all inputs to a terminal or other input device. If a customer enters a PIN directly into the terminal system, this may potentially be picked up by such a sniffer program and reported to an adversary. Note that desktop computers are especially susceptible to this type of attack, given that they are liable to infection by foreign software, for example a virus or a worm, that may act as the sniffer program.

An even more important vulnerability for pass codes is that an adversary may simply observe a user entering the pass code into a terminal. Since the pass code is often quite short (typically four digits for a PIN), and is entered for each new transaction, it is not difficult in practice for an adversary to acquire knowledge of a pass code through observation in this manner. This is especially true if the pass code is being entered at a very public location such as a supermarket checkout, where it is very difficult to conceal hand movements for keypad entry.

The problem is exacerbated by the ready availability of high quality miniature video cameras (once the exclusive preserve of undercover television reporters). Such cameras are now easily purchased at modest cost from many electronics stores, and can be used in a concealed manner to film a card holder entering a PIN in a public place. The video recording can then be subsequently studied in order to determine the particular PIN that the customer entered.

Despite such concerns, PINs are being increasingly used for transactions involving credit and debit cards. In the past such transactions have generally relied upon a customer signature for authorisation purposes, but this is vulnerable to forgery. One problem is that the staff who have to verify the signatures in shops, cafes, etc., are frequently under time pressure to process the transaction as quickly as possible, and may not be highly motivated to detect forgery. Accordingly, a fake signature of even quite poor quality may be accepted.

The use of PINs to authorise credit card transactions removes reliance upon staff verification, and indeed enables completely automated processing of the transaction. Nevertheless, from a customer perspective it has the worrying consequence that if a PIN is stolen, it is more difficult for the card holder to prove that the card has been used fraudulently. Thus if a transaction involving a signature is subsequently disputed, then the signature can be studied in much more detail than at the time of the transaction itself. Consequently, it is very likely that any forgery can be detected, in retrospect at least.

With the use of a PIN however, once the PIN itself is compromised and available to an adversary, there is no way of distinguishing between legitimate use of the card by the card holder and fraudulent use of the card by an adversary. In other words, there is no biometric linkage that ties the PIN to the particular card holder. Rather anyone who knows the PIN is, in effect, able to authorise card transactions. Accordingly, if a PIN is discovered by an adversary, it becomes very difficult for a card holder to demonstrate that his or her card has been used fraudulently.

Another concern relating to PIN authorisation for credit cards stems from the nature of potential criminal activity relating to these cards. Thus signature-based cards are most susceptible to opportunistic theft. For example, a dropped card may be found, or perhaps a handbag containing a card is snatched. A criminal can then try to forge the card signature in order to make fraudulent purchases with the card.

In contrast, with a PIN-based card, criminal activity may well be triggered by observation of the card holder's use of the PIN, thereby allowing the PIN to be deduced. It then becomes attractive for a criminal to specifically target the card holder in order obtain this particular card, for which the PIN is already known. This may entail a higher level of violence against the card holder (compared to the opportunistic theft of signature-based cards).

Such consideration underline the importance of ensuring that a card holder is properly able to protect the PIN or other form of pass code against disclosure to third parties.

SUMMARY OF THE INVENTION

Accordingly, one embodiment of the present invention provides a method of accepting a pass code. The pass code might represent a personal identification number (PIN), a password, or any other form of code used to control access to a resource. The method involves providing a user with a machine-generated challenge, and receiving a response from the user. The response represents a transformation from the challenge provided to the user to a pass code allocated to the user, and so is dependent on both the pass code to be entered, and also the original challenge. The response allows the user to be validated against a stored data record of the pass code.

With this approach, it is less problematic if an adversary observes the user input, since this does not correspond directly to the pass code. Rather, an adversary needs to obtain both the challenge and the response in order to be able to determine the user pass code (providing the challenge is independent of the pass code).

Typically, a new challenge is generated for each user authorisation. This ensures that a response entered for a previous challenge cannot be successfully re-entered by an adversary for a new authorisation, since the new authorisation will have a new challenge, and hence require a different response. In one embodiment, the challenges are generated on a random basis. This prevents an adversary with knowledge of one response for one challenge being able to predict the appropriate response for another challenge.

In general, providing a user with a challenge comprises displaying the challenge to the user on a terminal or such-like, such as by using a LCD panel or other form of display. The terminal can be designed to ensure that the challenge is not visible to people other than the user, for example by having a limited viewing angle and/or by providing some form of collimator or shield around the display. Note that it is normally easier to restrict viewing of a display than it is to restrict viewing of a keypad used for conventional PIN input (since in the latter case, the terminal must at least allow the user to view the keypad).

The response from the user is generally received as a set of one or more modifications to be applied to the challenge. These modifications act to transform the challenge into the pass code being entered by the user. Typically the modifications are received as directional input from the user, such as by pressing one or more arrow keys that increment or decrement the challenge respectively. In some embodiments, the modifications are performed on a character by character basis for the pass code. In other words, a transformation for one character is entered, then another, and so on. This is especially convenient where the challenge is arranged to have the same number of characters as the pass code. Alternatively, the pass code might be manipulated as a whole, especially if a relatively short numerical pass code, such as a PIN, is being used. A wide range of other input devices could be used instead of arrow keys, such as a joystick, a mouse, and so on. Some special facility, for example, an enter button, might be provided to allow a user to indicate when the response has been completed.

The modification being entered by the user is generally fed back to the user in visible form, thereby assisting the user in completing the response correctly. Typically, if the initial challenge is provided to the user on some form of display, then as the user enters modifications to transform the challenge into the pass code, these transformations are applied to the displayed code. When the displayed code matches the pass code to be entered, the user knows that the response has been completely entered. As previously mentioned, the display can be shielded or otherwise protected to prevent third parties viewing the displayed pass code at this point.

Once the response has been entered, one option is to calculate the pass code either on the basis of the known challenge and response, or by accessing the code currently on the display (which corresponds directly to the entered pass code). The pass code determined in this matter can then be subsequently processed as in prior art systems (i.e. as if the pass code itself had been directly input). Alternatively, the user response may be transmitted to some remote unit, such as a security system, to authenticate the entered response. Note that the entered pass code per se might never be calculated. For example, the security system might predict the response to be entered by a user, based on knowledge of the challenge and the authentic pass code. The response received from the user can then be tested against this prediction, and if there is a match, the response from the user corresponds to what was expected, and so the user is validated.

If the challenge and response are transmitted over a network, they may be vulnerable to interception. One way to protection against this is to use a separate challenge-response, such as described in relation to FIG. 2, for these communications. In one embodiment this involves supplying a communications challenge from an authorisation unit that maintains a stored record of the pass code. The entered pass code is then used to encrypt the communications challenge, with the encrypted communications challenge then being transmitted back to the authorisation unit for verification against the stored pass code.

Another embodiment of the invention provides a terminal for use in accepting a pass code. The terminal includes an output device such as a display screen for providing a user with a challenge, and an input device such as a keypad for receiving a response from the user. The response represents a transformation from the challenge to a pass code allocated to the user, and allows the user to be validated against a stored record of the pass code allocated to the user.

Another embodiment of the invention provides a method for using a pass code to validate a user. The method comprises receiving a request from a user for validation, and generating a challenge in response to the request. The challenge is then provided to the user, who supplies in turn a response. The response represents a transformation from the challenge to the pass code allocated to the user. The user is then validated on the basis of the response against a stored version of the pass code.

Another embodiment of the invention provides an authorisation system for using a pass code to validate a user. The authorisation system includes a random number generator operable to generate a challenge, an output device operable to provide the challenge to a user, and an input device operable to receive a response to the challenge from the user. The response represents a transformation from the challenge to the pass code allocated to the user. The authorisation system further comprises a validation unit, which authorises the user on the basis of the response against a stored copy of the pass code.

Another embodiment of the invention provides a computer program product comprising instructions encoded on a medium. The instructions when loaded into a machine operate the machine to process a user pass code by providing a user with a challenge, and by receiving a response from the user. The response represents a transformation from the challenge to a pass code allocated to the user, and allows the user to be validated against a stored record of the pass code allocated to the user.

The instructions may be supplied on a storage medium, such as a floppy disk, flash memory, a ROM, a CD-ROM, or a DVD, or a transmission medium, such as a signal over a wired or wireless network. In operation, the instructions are typically transferred (usually via RAM) to a processor in the machine for execution.

It will be appreciated that the system and computer program product embodiments of the invention will generally benefit from the same particular features as the method embodiment of the invention described herein.

The approach described herein may be implemented across a very wide range of environments where some form of pass code validation is utilised. For example, the approach may be employed for controlling building or machine access (in which case the pass code may not be specific to the user); for validating credit and debit card transactions; and for accessing and manipulating on-line accounts. The skilled person will be aware of a very wide range of other circumstances and situations in which the pass code approach described herein may be employed.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 3:
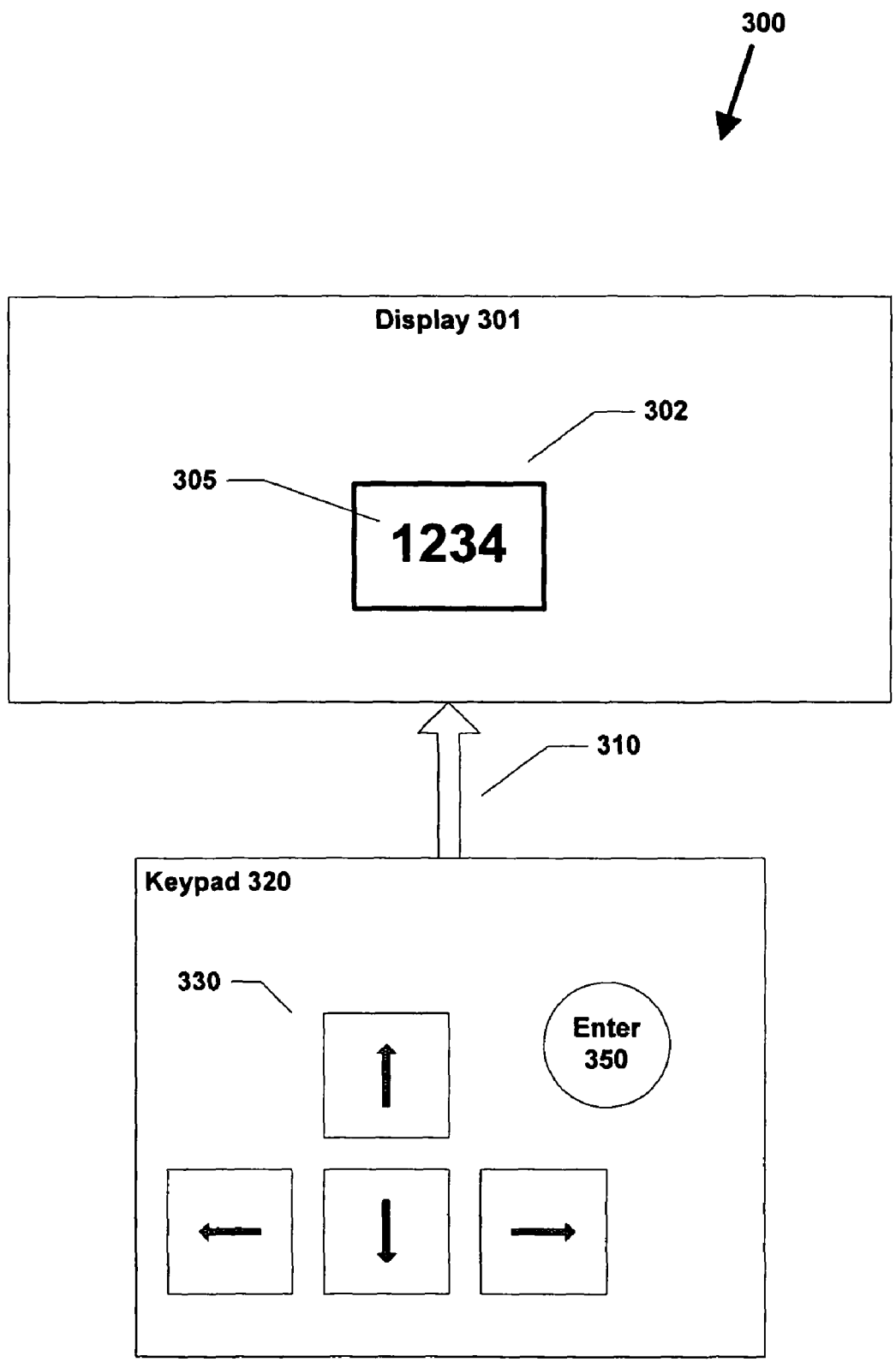
FIG. 3 is a schematic diagram of apparatus for accepting a PIN in accordance with one embodiment of the invention.

FIG. 3 is a schematic diagram illustrating a terminal 300 for receiving a user pass code in accordance with one embodiment of the invention. Such a terminal may potentially be utilised in a wide variety of configurations, including any of those previously illustrated in FIGS. 1A, 1B, 1C, and 1D. The terminal 300 has two main components, a keypad 320 and a display unit 301, which are connected together by a suitable communications link 310. Link 310 allows the display unit 300 to be controlled or at least modified by input into keypad 320, and may be provided by any suitable wired or wireless link (e.g. bus, cable, infrared, etc). Note that in some embodiments, display unit 301 and keypad 320 may be integrated into a single system.

Display unit 301 incorporates a screen output device 302, such as an LED or LCD panel or a CRT monitor, which can display a set of characters 305. In the example shown in FIG. 3, the characters are numerical digits, but in other embodiments they may be alphabetical or alphanumerical characters. The characters 305 shown on output device 302 can be modified by activation of the user-input keys 330 in keypad unit 320. Keys 330 can be provided in any suitable form, such as by a touch sensitive screen, a mechanical keypad, and so on.

In the particular example shown in FIG. 3, there are four input keys 330. Each of these input keys is marked with a directional arrow, one for Up, one for Down, one for Left and one for Right. The Up key is used to increment a selected character on screen 302 by one unit, while the Down key is used to decrement the selected character by one unit. The Left and Right keys are used to select a different character on screen 302. Keypad 320 further has an Enter button 350. This can be used to signal when a user has adjusted characters 305 to the desired output, analogous to the Enter (Return) key on a conventional computer.

As an example of the use of keypad 320, assume that the leftmost digit on screen 302 is currently selected (i.e. the "1"). Pressing the Up key once will then alter the output to 2234. Next, pressing the Right key twice and then the Down key once will change the third character from 3 to 2. The output would now be 2224. It will be appreciated that keypad 320 can be utilised in this manner to obtain any desired character output 305 from display unit 301.

Typically the currently selected character (i.e. the one that will be affected if an Up or Down arrow is pressed) is visually distinguished from the other output characters. For example, the selected character may be shown flashing or in reverse highlight. Other possibilities are that the selected character may be shown brighter or in a different colour compared to the other characters, or marked in some special manner, such as by a cursor or other indicator.

In accordance with one embodiment of the present invention, a user operates keypad 320 to convert a number (or string) initially displayed on screen 302 into a pass code to be entered by the user. For example, assume that the pass code to be entered comprises the 4-digit PIN 5351 (say), and the number initially displayed on screen 302 is 1234 (as shown in FIG. 3). This can be entered by pressing the following sequence of buttons: Up, Up, Up, Up, Right, Up, Right, Up, Up, Right, Down, Down, Down, Enter.

Note that this sort of data entry mechanism is readily understood by users, since it is intuitive and supported by the visual feedback on display 301. In addition, an analogous approach is already employed in certain other contexts, such as for setting the time on digital clocks (which normally default to a set time when first switched on, leaving the user to convert from the default time to the current time, typically by using keys similar to those shown in FIG. 3).

It will be appreciated that other sequences of key presses can also be used to provide the same pass code input. For example, given the same initial display (1234) and the same PIN to be entered (5351), the user might activate the following sequence of key presses: Down, Down, Down, Down, Down, Down, Left, Down, Down, Down, Right, Right, Up, Left, Left, Left, Down, Down, Down, Down, Down, Down, Down, Right, Right, Enter. Note that here we are assuming modulo 10 operation, so that a digit can be incremented from 9 to 0 and then to 1 (or conversely decremented in the opposite direction), and likewise that we wrap around at the edges from the leftmost digit to the rightmost digit (and vice versa).

Figure 4:
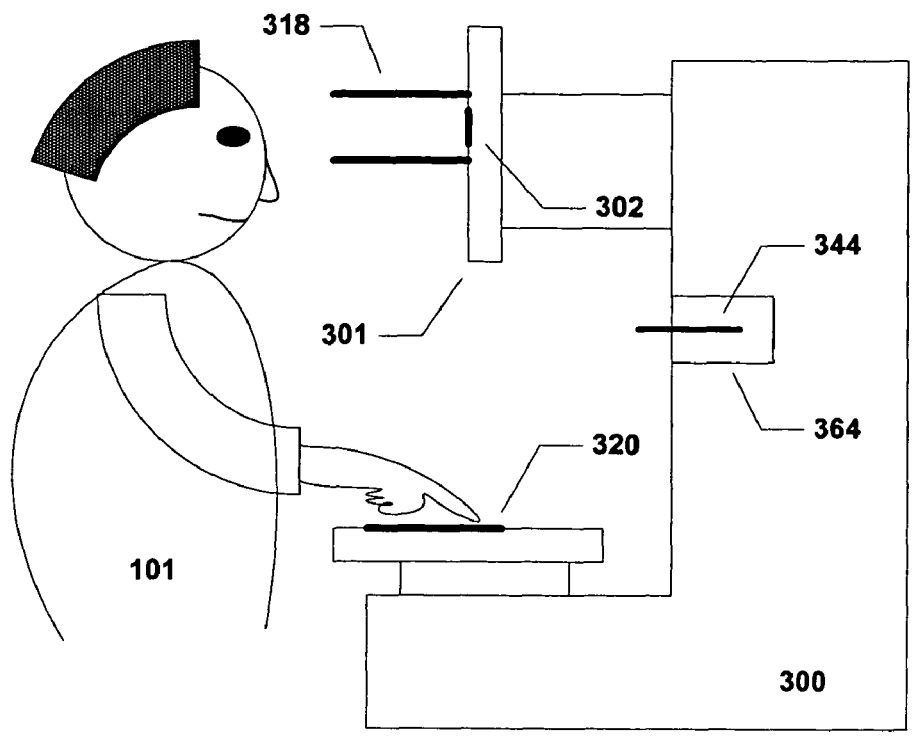
FIG. 4 is a schematic diagram of a card holder entering a PIN in accordance with one embodiment of the invention.

FIG. 4 is a schematic diagram showing the use of terminal 300 in accordance with one particular embodiment of the invention. As shown in FIG. 4, terminal 300 is provided with a display unit 301, a keypad 320, and a card reader 364 (the connections between these various components are omitted for clarity). A card holder 101 has inserted a card 344 into the card reader 364, and now has to enter a PIN or other form of pass code. The entered PIN is then verified against data held either on card 344 itself, or on some remote system (not shown in FIG. 4). Terminal 300 may for example represent an ATM, in which case successful entry of the PIN permits the ATM to dispense cash to card holder 101. Another possibility is that terminal 300 represents a checkout or kiosk where the card holder 101 is making a credit card payment with card 344. In this case, terminal 300 can be used to authorise the transaction on the basis of the PIN supplied by card holder 101.

As shown in FIG. 4, screen 302 is provided with a collimator or shield 318. This prevents anyone other than card holder 101 from viewing the output on screen 302. Alternatively (or additionally), various other protective measures may also be taken. For example, screen 302 may be arranged to support a very small range of viewing angles, and/or may be viewed through a particular lens combination such that the screen 302 is only in focus for the particular position in which card holder 101 is to stand.

The above measures help to ensure that an adversary is not able to learn the PIN of card holder 101 by illicitly viewing display 302 while the card holder 101 is entering the response. Furthermore, display unit 301 can be provided with various safeguards to ensure that output 305 is automatically removed from display 302 once card holder 101 has completed the transaction. For example, such removal could be triggered by hitting the Enter button 350 (see FIG. 3), and/or by sensing when card holder 101 is no longer in position in front of the terminal 300, such as by using optical and/or pressure sensors (not shown in FIG. 4). Another possibility would be for card holder 101 to activate screen 302 specifically to display characters 305, such as by pressing a button, a foot pedal, or some other such control device (not shown in FIG. 4). When the customer stops pressing the activation device, such as when leaving the terminal 300, the output 305 on screen 302 would automatically be deleted or modified.

In some embodiments, the display characters may not be affected by the user response, rather they are fixed to show the initial challenge (although the particular character being manipulated may still be highlighted somehow). This has the advantage that the pass code to be entered is never visible on screen 302. However, such an approach does require more mental effort on the part of the user. Thus a user first has to determine the difference between the initial challenge and the pass code to be entered, and then supply the required key strokes, all without any visual feedback on screen 302. This approach may be appropriate in circumstances where high security is more important than ease-of-use.

Figure 5:
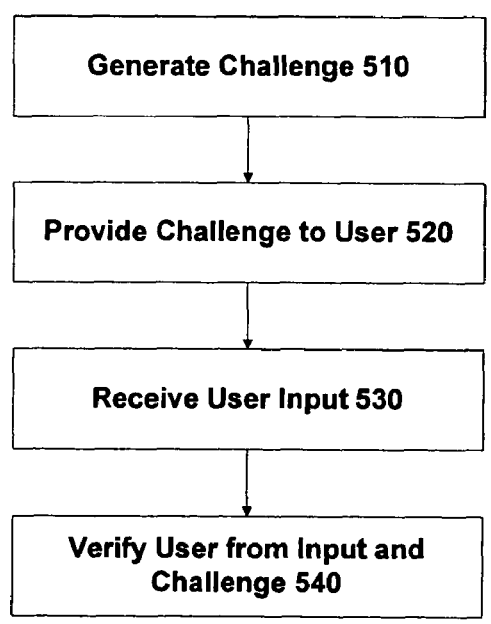
FIG. 5 is a flowchart depicting a method of validating a pass code in accordance with one embodiment of the invention.

FIG. 5 is a flowchart illustrating the use of terminal 300 in accordance with one embodiment of the present invention, such as to allow a user to enter a PIN for validation purposes in a secure manner. The approach of FIG. 5 can be used in any situation or configuration where it is desired to accept and authorise a user pass code, and is based on a challenge-response strategy. Note that the challenge-response strategy of the present invention is different from that described in relation to FIG. 2 (although it can in fact be used in conjunction with the approach of FIG. 2, as described in more detail below).

The processing of FIG. 5 starts with the generation of a challenge (step 510), which is normally initiated when a user requests access to a controlled resource, thereby triggering a need for authorisation. For example, the challenge may be generated in response to the user inserting a card 102 into an ATM or other form of terminal 110.

Figure 1A:
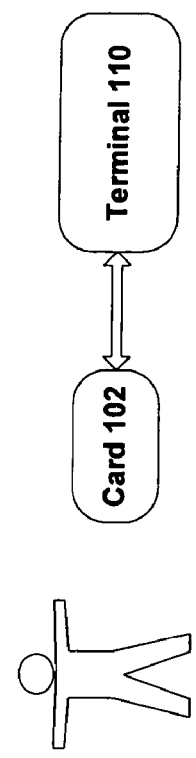
FIGS. 1A, 1B, 1C, and 1D are schematic diagrams illustrating various instances in which a pass code may be used.
Figure 1B:
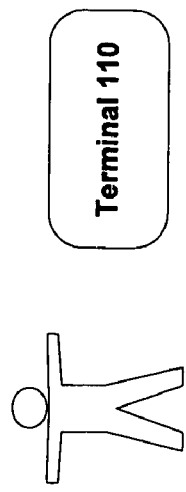
Figure 1C:
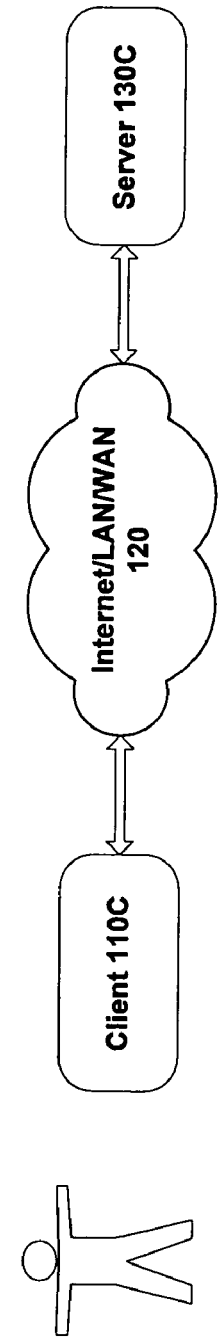
Figure 1D:
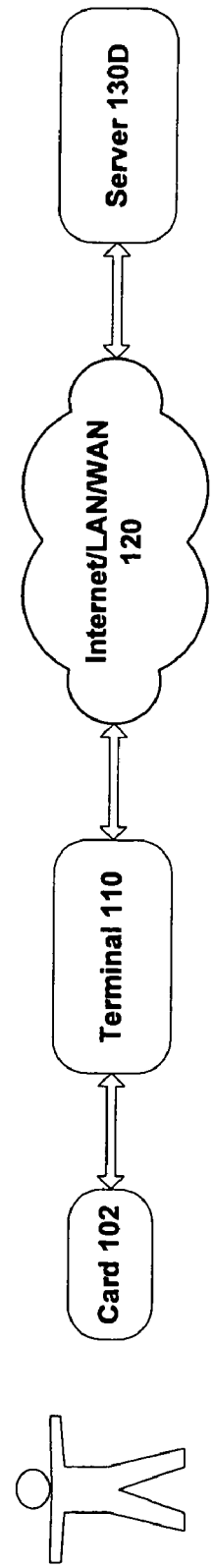
Figure 2:
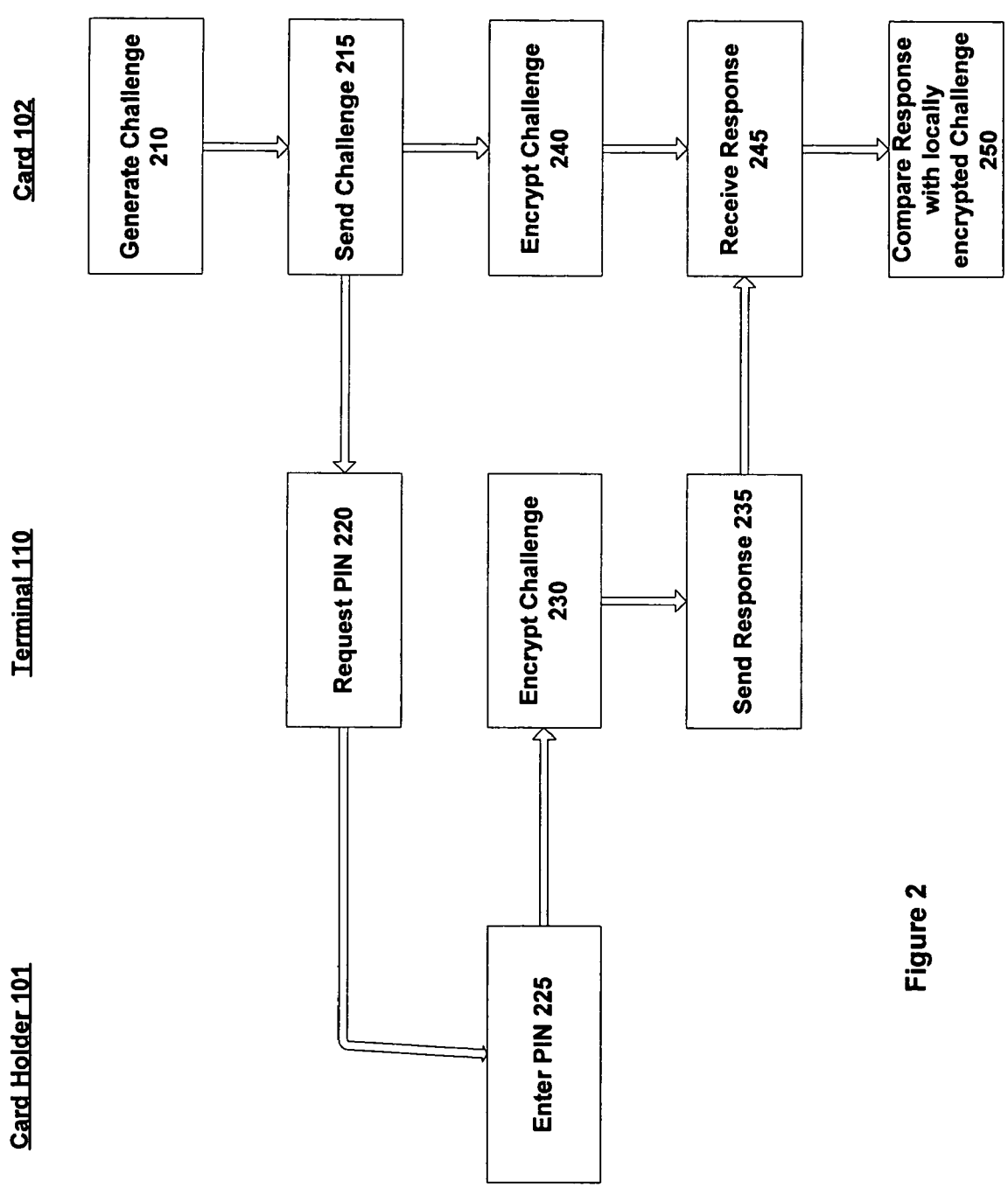
FIG. 2 is a flowchart illustrating the use of a challenge-response strategy to handle the input of personal identification numbers (PINs)

As with the challenge-response strategy of FIG. 2, a different challenge is normally used for each new authentication. This ensures that even if an adversary is able to ascertain a valid response for one particular challenge, this response cannot be used to authenticate a future transaction, since the required response will be different (given the different challenge).

Of course, if a challenge is only a four-digit number (such as shown in FIG. 3), then over time the total number of authorisations may well be much larger than the total number of possible challenges. Accordingly, the challenge for one authorisation will have to be re-used in another authorisation. However, security is not compromised providing that this is not done in a predictable way—i.e. it is not possible to deduce a challenge to be used in a future authorisation from a knowledge of the challenges used in preceding authorisations. A challenge is therefore normally generated on a random basis for each new authorisation (using either a true or pseudo-random number generator). This ensures that there is no (discernible) correlation between successive challenges. If this were not the case, then such a correlation might allow an adversary with knowledge of a response to a first challenge to predict the correct response to a second challenge, without any knowledge of the first and second challenges themselves. For example, if each new challenge were known to be simply one more than the previous challenge, then a known response to one particular challenge could be modified as appropriate in order to produce a validating response for a new challenge used in a future transaction. Generating new challenges on a random basis however prevents such a form of attack.

In the conventional challenge-response strategy of FIG. 2, the challenge is generated by (or at least notified to) the unit that the stores the validation copy of the pass code. For example, in the context of a smart card provided with a stored PIN, the challenge is generated by the smart card itself. In contrast, in the processing of FIG. 5, the challenge may potentially be generated at various locations, such as within card 344, within terminal 300, or at some other (perhaps remote) system. Certain other embodiments of the invention are however subject to constraints regarded the locations where the challenge may be generated, as will be described in more detail below.

The challenge is now provided to the user (step 520) by displaying on screen 302. This will involve first transmitting the challenge to terminal 300 if the challenge is not generated within terminal 300 itself. For example, in some embodiments the challenge may be generated on card 344, and then read by card reader 364 for display on screen 302. As previously discussed, for security reasons the display of the challenge might be conditional, for example, terminal 300 may have to sense that a card holder is correctly positioned, or the user may have to perform provide some specific activation input, prior to any output 305 becoming (or remaining) visible on screen 302.

The user now responds to the challenge by providing inputs into keypad 320 that convert the displayed challenge into the pass code or PIN for that particular user (step 530). This operation has already been described in relation to FIG. 3, whereby the user presses the arrow keys on keypad 320 to alter the initially displayed output (i.e. the challenge) into his or her PIN number. In general, the display 302 will alter to reflect the user response, thereby providing feedback to the user, although in some embodiments this may not be the case (i.e. the display 302 might continue to show the initial challenge).

The challenge generated at step 510 is usually in the same format as the pass code to be entered by the user. For example, if the pass code comprises a four digit PIN, the challenge also typically comprises a four-digit number. This ensures that the response process for a user is more natural and intuitive. (In contrast, in the challenge-response strategy of FIG. 2, the challenge is encrypted using the entered pass code, and hence may be of arbitrary length in relation to the pass code itself).

The response is now used to validate the user (step 540). In broad terms, there are two main routes for performing this validation. In the first approach, terminal 300 itself determines the pass code that the user has entered. In some embodiments, the terminal may have to construct the entered pass code from acknowledge of the initial challenge and also from the sequence of user inputs. For example, as discussed earlier in relation to FIG. 3, if the challenge is "1234" and the user input is Up, Up, Up, Up, Right, Up, Right, Up, Up, Right, Down, Down, Down, Enter, then the terminal 300 can calculate that the entered PIN is "5351". Another possibility is that the terminal is able to read out directly the number or string currently shown in screen 302, assuming that this is being updated to reflect the user input.

Once the terminal 300 has determined the entered pass code based on the challenge and the user input, authorisation may continue as per prior art systems (in other words, as if the user had entered the pass code directly into terminal 300). This may include using the challenge-response strategy of FIG. 2 to return the entered pass code to some location for validation. Thus the user validation may involve two separate challenge-response pairings, one in relation to user input of the pass code (as illustrated in FIG. 5), and one for communicating the entered pass code between devices (as illustrated in FIG. 2).

Figure 7:
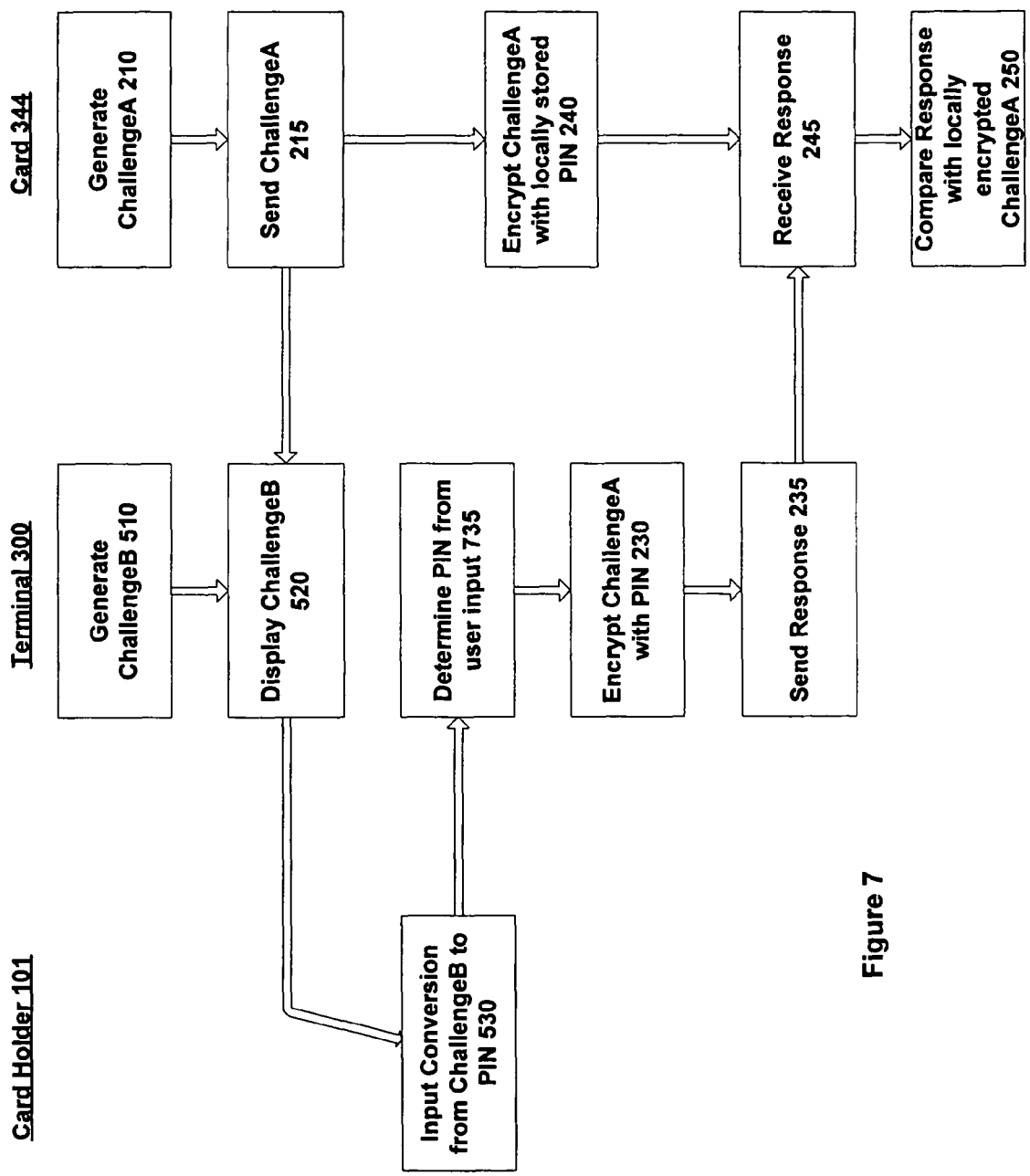
FIG. 7 is a flowchart illustrating the use of a challenge-response strategy to handle the input of a PIN in accordance with one embodiment of the invention.

Such a procedure is illustrated in the flow-chart of FIG. 7, which can be regarded to some extent as a combination of the flowcharts of FIGS. 2 and 5. For the sake of example, the processing is assumed to take part in the apparatus illustrated in FIG. 4, and starts with the generation of a challenge within card 344 (step 210). This first challenge, which will be referred to as Challenge A, is the one used for PIN communication (rather than PIN entry). Challenge A is now transmitted from the card to the terminal 300 via card reader 364 (step 215).

The terminal generates the challenge to be used in PIN entry, which will be referred to as Challenge B (step 510). Challenge B is now displayed to the card holder 101 on display 302 (step 520). The card holder uses keypad 520 to provide the inputs needed to convert Challenge B into the user PIN to be entered (step 530), as previously described in relation to FIG. 5. Based on this user response, the terminal 300 is able to deduce the card holder PIN (step 735). Terminal 300 then uses the card holder PIN to encrypt Challenge A as received from the card 344 (step 230) in order to form a response. This response is then sent back to the card (step 235, 245), where it can be used to validate the user entered PIN (step 250), as previously described in relation to FIG. 2.

Note that in the processing of FIG. 7, card 344 performs the same operations as in FIG. 2. In other words, the challenge-response strategy for the input of the user pass code is transparent to card 344. This has the advantage that as terminals are replaced or upgraded to support challenge-response for pass code input as described herein, such terminals 300 can maintain compatibility with the existing base of cards 102 in circulation. One possibility would be to install new terminals 300 at locations that are particularly vulnerable to PIN or pass code theft, and leave conventional terminals installed at other locations.

It will be appreciated that there are several possible variations on the processing of FIG. 7. For example, the challenge-response for pass code input (steps 510, 520, 530 and 735) is largely independent of the receipt of Challenge A from the card 344, and so can be performed prior to receiving Challenge A from card 344 if so desired. Similarly, the encryption of Challenge A on card 344 is independent of communicating the challenge and response to/from card 344, and so can be performed at any time between the generation of Challenge A (step 210) and the subsequent validation (step 250).

It will also be appreciated that Challenge B need not be generated on terminal 300, but rather may be generated at any convenient location and transmitted to terminal 300 via any appropriate mechanism. For example, Challenge B may be produced within a dedicated random number generator unit. In such circumstances, the originator of Challenge B does not play any further part in the processing of FIG. 7.

One possibility is that Challenge B is generated on card 344, along with Challenge A. Indeed, in some embodiments, the same number (or string) may be used for both Challenge A and Challenge B, since both are randomly generated. (More probably, Challenge B would be taken as a portion of Challenge A, since they are likely to have different lengths).

Figure 6:
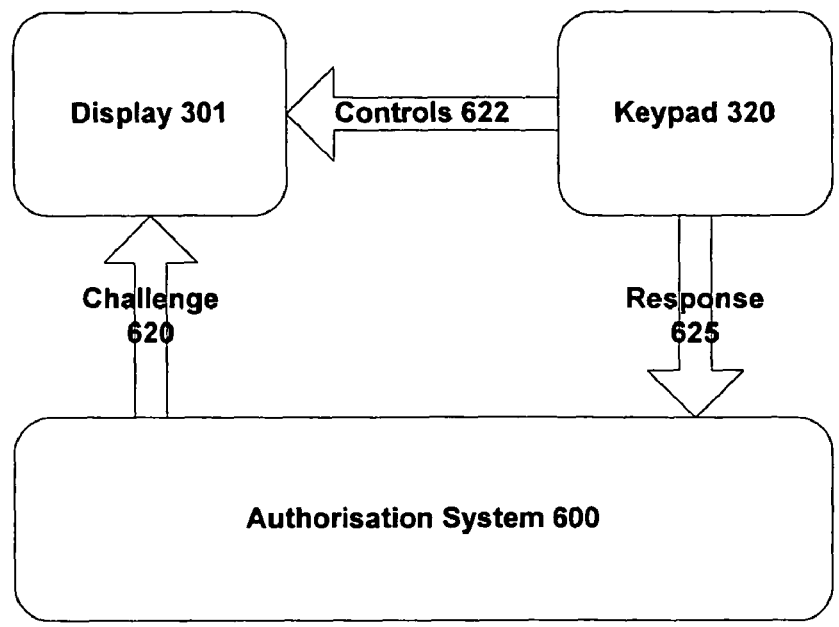
FIG. 6 is a schematic diagram illustrating apparatus for validating a pass code in accordance with one embodiment of the invention.

The second general approach to validating the user response at step 540 (see FIG. 5) is where terminal 300 itself does not calculate the PIN, but rather provides the user response to some other system for verification. One configuration for performing this approach is illustrated in FIG. 6. This shows authorisation system 600, which maintains (or at least has access to) the authentic copy of the user pass code (i.e. the one to be validated against). The authorisation system generates a challenge 620 for user input (corresponding to step 510 in FIG. 5). This challenge is sent to a display unit 301, where it is displayed to a user (corresponding to step 520 in FIG. 5). The user now operates keypad 320 as previously described in order to convert the displayed challenge into the pass code to be entered. In response to the keypad operations, the keypad-sends control signals 622 to the display unit 301. This then allows the display unit to update the number or code visible on the display unit, thereby providing feedback of the user input. In addition, the keypad also transmits the user input as response 625 back to the authorisation system. It will be appreciated that response 625 contains the same underlying information as control signals 622, namely the user response, although it will typically be in a different format. In addition, although a control signal will normally be transmitted to the display unit 301 after each key press, in order to update the display unit accordingly, response 625 may not generally be transmitted until the "Enter" key 350 of FIG. 3 is pressed. In other words, response 625 is typically transmitted to authorisation unit 600 as a single message after the user input has been completed.

Once authorisation system is in possession of response 625 from keypad 320, it can use this information in conjunction with knowledge of challenge 620 (as originally sent out by authorisation unit 600) to determine the pass code that has been entered by the user. This entered pass code can then be validated against the legitimate pass code available to authorisation system 600.

There are a variety of possible modifications to the embodiment of FIG. 6. For example, the challenge 620 may be routed to the display unit 301 from authorisation unit via keypad 320. However, having completely separate transmission paths for the challenge 620 and the response 625, as shown in FIG. 6, improves security, as will be discussed in more detail below.

Authorisation system 600 may be implemented in a variety of different systems. In one embodiment, it may be implemented on a smart card 344. In another embodiment, it may be implemented on some local or remote server accessible to terminal 300.

Figure 8:
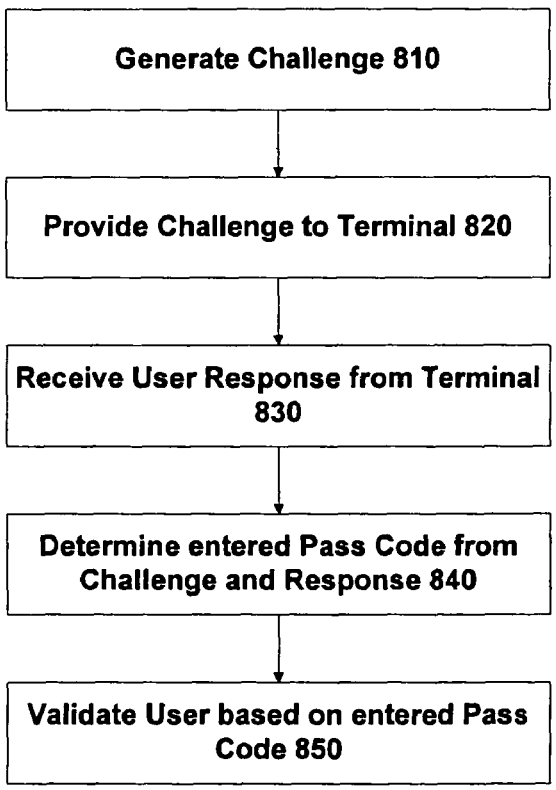
FIG. 8 is a flowchart illustrating the use of a challenge-response strategy to handle the input of a pass code in the embodiment of FIG. 6.

FIG. 8 is a flowchart illustrating the operations of authorisation system 600 in accordance with one embodiment of the invention. The method starts with the generation of a challenge (step 810). As previously described, a new challenge is typically generated in response to each new authorisation request. The challenge may be generated within authorisation unit 600 itself, or supplied by some other (secure) device.

The challenge is now supplied by the authorisation system 600 to the terminal 300 (step 820). A user enters a response into the terminal as described above, with this response then being received back at the authorisation system 600 from the terminal (step 830). Note that the communication of the challenge and response between the terminal and the authorisation system at steps 820 and 830 may be protected if desired by some form of encryption, such as the challenge-response approach described in relation to FIG. 2.

The terminal now determines the pass code entered by the user (step 840) on the basis of the initial challenge and the received response. This allows the authorisation system to validate the user by comparing the entered pass code with the authentic copy of the pass code for that user stored by (or accessible to) authorisation system 600.

Note that the details of steps 840 and 850 will vary from one implementation to another. For example, if the pass code being entered is a PIN, then in some embodiments the response returned by the terminal at step 830 may comprise a four-digit number representing difference between the challenge and the user PIN. For example, if the challenge is 1234 and the pass code to be entered is 5351, the received response might be 4127 (assuming modulo-10 arithmetic for each character), or alternatively 6983, depending upon the particular convention used. (It will be appreciated that 6983 is the complement of 4127 modulo-10). In this approach, the terminal itself is responsible for converting the user input, perhaps in the form of arrow key presses, into a numerical representation.

Another possibility is that the authorisation system 600 receives the raw user input from the terminal, for example as the sequence of arrow key presses described above in relation to FIG. 3. The authorisation system 600 is then responsible for interpreting this input sequence in order to obtain the pass code entered by the user. One potential drawback with this approach is that the authorisation system 600 typically has to understand the keypad input from the terminal. In other words, it has to recognise the format of the response, such as being a sequence of Up, Down and so on. There may be a wide variety of terminal types that provide different user input formats. In these circumstances it is probably simpler for the authorisation system if the responses from the terminals are received in a common format, most likely the (alpha)numerical representation described above.

A further benefit of a terminal supplying the authorisation system 600 with a consistent numerical (or alphanumerical) representation of the user response is that this can then be readily integrated into the challenge-response communication technique of FIG. 2. Thus the authorisation system can send a communication challenge to the terminal, and the user response can then be used as a key to encrypt this communication challenge into a communication response, which is then returned to the authorisation system 600. Note that with this approach (and analogous to the options discussed in relation to FIG. 2), the validation may be performed in some embodiments without specifically determining the entered user response or pass code. Rather, the authorisation system may determine the response that the user should enter (the authorisation system can do this since it has knowledge of both the user pass code and also the challenge generated at step 810). The authorisation system can then use this response to encrypt the communication challenge. This encrypted communication challenge can then be directly matched against the communication response received from a terminal in order to perform the validation.

If the user has entered an incorrect response, then the validation fails. This can be due to one of two possibilities: (a) the user does not know the correct pass code, and so is properly regarded as unauthorised; or (b) the user does know the correct pass code, but has somehow entered an incorrect response, for example by accidentally pressing the wrong sequence of buttons. Note that in this latter case, the user is likely to want to repeat the validation process (for example to authorise a credit card transaction).

One possibility if validation fails is to start the whole authorisation process over again, in other words generating a new challenge for the user to respond to. Alternatively, the user may be permitted another attempt at providing the correct response for the initial challenge, with the system then trying to validate this subsequent response.

Various techniques can be employed to ensure that this does not expose the system to a brute force attack that tries all possible responses on a trial and error basis. These techniques are well-known to the person skilled in the art from normal password operations, and typically require an increasing delay between (failed) validation attempts. For example, a user may be allowed one retry without delay after an incorrect response. However, if this second response is also incorrect, the system then waits a predetermined time interval before any successful validation can be performed by that user (any validation attempt during this interval is automatically rejected, irrespective of whether the user has entered a correct or incorrect pass code). If a third response after the predetermined time interval is also incorrect, the system then waits a second, longer predetermined time interval before any successful validation can be performed. Typically the increase in delay times between successive attempts is exponential, and so soon rises very quickly.

Note that such a back-off approach can be used where the initial challenge is retained throughout the series of user responses, and also where a new challenge is generated for each new user response. In addition, the back-off approach can be made sensitive to the response actually entered by the user. For example, if the user response is completely incorrect (e.g. every character is wrong), then the delay time might be increased more than if the user response is only slightly wrong (e.g. only one character incorrect), the rationale being that this latter case is more likely to reflect a user mistake than an unauthorised user.

It will be appreciated that the challenge-response approach described herein for pass code entry has the significant advantage that the user does not specifically depress keys corresponding to the pass code itself on keypad 320. Instead, the user only inputs a response that does not allow the pass code itself to be determined without knowledge of the original challenge. Accordingly, an adversary cannot obtain a pass code simply by observing user input to keypad 320 (whether in real-time or on video).

It is recognised that the pass code being entered by a user may in some embodiments be displayed on screen 302. However, as previously discussed in relation to FIG. 4, there are a variety of precautions that can be taken to prevent an adversary being able to learn the pass code from screen 302 itself. It is much easier to restrict viewing of output on a screen than viewing of input into a keypad, such as by use of shielding, limited duration display, and so on.

The challenge-response approach described herein also makes it harder for an adversary to discern a user input from simple observation than for conventional pass code entry. Thus in conventional systems, the pass code is typically entered via a relatively large keypad (e.g. keys for 10 different digits at least). This makes it slower and more cumbersome for a user to operate. In addition, the number of digits or characters to be entered is normally predetermined and a relatively small number (e.g. 4 for a standard PIN). These factors all help an adversary to determine the entered pass code by observation.

In contrast, with the challenge-response strategy described herein, the number of keys on the keypad is typically much smaller (e.g. four in FIG. 3, excluding the Enter key). This facilitates faster user operation of the keypad. Furthermore, the number of key presses for entering the response is typically large compared to the number of digits or characters in the pass code itself, and may often involve repeated presses of the same key. The number of key presses for the response is also variable, depending on the particular challenge (and also potentially on how the user decides to perform the input). All these considerations make it much harder for an adversary to determine a user input than for conventional systems.

Another vulnerability of conventional systems is that a user enters the same pass code for each successive authorisation. Consequently, by observing repeated authorisations, it is easier over time for an adversary to discern a pass code being entered. In contrast, with the present approach the user input changes for each new authorisation (assuming that a different challenge is generated). This makes it harder for an adversary to deduce a response, since they only have a single attempt at observation. Moreover, even if they do successfully discern the response that was entered, then this cannot be used for a future (illicit) authorisation. This is because the compromised response will not work with a newly generated challenge for the next authorisation.

In some embodiments therefore, it may be decided that with a challenge-response strategy to protect the pass code input, there is little need to defend keypad 320 against third party observation. This can then allow keypad 320 to be designed in a user friendly manner to minimise the likelihood of error and to reduce pass code entry time. In other embodiments however, keypad 320 may be designed to make it difficult for third parties to view a user input, thereby serving as an additional layer of protection.

Another way for an adversary to try to obtain a pass code is to use a sniffer program that detects user inputs. A personal computer installed at home tends to be susceptible to this form of attack (in contrast it is relatively secure against simple visual observation). The challenge-response strategy for user input is of benefit here, because even if an adversary does manage to acquire a user input (i.e. the response) via a sniffer program, this still does not disclose the pass code being entered. (Note that since a home system is relatively safe against third party oversight, then counter-measures to this form of attack on display unit 301, such as the shield 318 of FIG. 4, may be omitted).

It is also possible that a sniffer program tries to read out the contents of the display unit 301 (although this is generally more difficult than intercepting the user inputs). This can potentially give direct access to the pass code being entered, if this is output on the display at the completion of the user response.

One protection against this is to adopt the architecture of FIG. 6. Here the display receives the initial challenge 620 from authorisation system 600, and also control signals 622 from the keypad 320. However, the response 625 back to the authorisation system 600 is from keypad 320. In this configuration, a sniffer program in the keypad 320 is unable to determine the pass code being entered, because the keypad 320 only has visibility of the response. In contrast, a sniffer program in display unit 301 could, in principle at least, deduce the pass code being entered from challenge 620 and controls 622. However, display 300 has no output facility. In other words, even if the sniffer program did ascertain a pass code, it could not export this information back to an adversary (or at least any outgoing communications from display unit 301 would be an immediate sign of security problems).

Another possible attack on the challenge-response user input approach described here is to try to intercept the challenge and response in transit between systems. Note that in some embodiments, such as illustrated in the flowchart of FIG. 7, the challenge and response are retained in terminal 300. Accordingly, such embodiments are not vulnerable to this form of attack.

In other embodiments, such as illustrated in FIG. 6, the challenge and/or response may be transmitted over a network. In this case, it is possible to use encryption to protect any transmitted information. A further precaution is to use separate transmission paths for the challenge and the response, such as shown in FIG. 6. Consequently, any adversary would have to be able to intercept both channels in order to gain access to the challenge and to the response (having access to only one of these would not allow the pass code to be deduced).

It will be appreciated that there are many possible variations on the approach described above. For example, with reference to keypad 320, the Left and Right keys might be omitted. The characters in output 305 could then be selected automatically one at a time (e.g. starting from the left), and adjusted using the Up and Down arrow keys. The user would then hit the Enter key 350 after each character had been correctly entered. Note that since the digits of FIG. 3 are assumed to wrap round modulo-10, it would also be possible to omit the Down (or alternatively the Up) key, since any digit is accessible from any other digit by repeated pressing of just one of these keys. One embodiment might therefore be provided with three keys, namely: a key to move between characters (such as a Right key), a key to scroll individual characters (such as an Up key), and a key to indicate when the response has been completed (such as an Enter key).

The embodiment of FIG. 3 performs a single increment or decrement for each key press. In other embodiments, holding down a key may cause repeated increments/decrements as appropriate. For example, holding down the Up arrow may cause a digit to be steadily increased, one unit at a time, until the key is released.

The keypad 330 may also be replaced by (or combined with) some other form of user input device, such as a mouse, tracker ball, joystick, touch sensitive screen, and so on. One option with a joystick might be for sideways movements to shift the selection between digits, while up and down joystick movements would increase or decrease the selected digit or character. The further the joystick is pushed (or pulled), the faster rate at which the digit is increased (or decreased). It will be appreciated that in such an implementation it is particularly difficult for an adversary to gain knowledge of the response being entered simply by observing the user input.

In some embodiments, the number (or alphanumeric string) in display 302 might be processed in its entirety, rather than as a set of individual digits. In this approach, the Left and Right arrow keys are redundant, and the Up and Down arrow keys would be used to increase or decrease the displayed number (as a whole) until it matches the pass code to be entered. This approach could in principle be adopted with letter pass codes by incrementing them in alphabetic fashion, but is more intuitive for numerical pass codes (such as PINs). Note that it would generally be desired here to give the user some control over the speed of cycling between numbers, so that it does not take to long to convert the initial challenge into the PIN to be entered. For example, the longer, harder or further a key or other input device is actuated, the faster the displayed number increases or decreases.

Although the Enter key 350 is shown as part of keypad 320 in FIG. 3, in other embodiments the Enter key may be located elsewhere (potentially on display unit 301). Indeed, some embodiments may dispense with the Enter key altogether. For example, a building security system may permit a door to be opened whenever the user input represents the correct code for the door. Note that such an authorisation may only be valid for a predetermined period, after which the security system will display a new challenge. In addition, the user input may disappear from view from panel 302 (even if the input still effective to open the door for a limited period thereafter), to minimise the possibility of it being seen by any third party.

Other embodiments may adopt different user input strategies. For example, the user input might be entered, at least in part, by voice command (this is especially feasible given that the response by itself is no longer sensitive, compared to prior art input of an actual pass code). Another possibility is that a user might be required to enter as a response the numerical difference between the challenge and a PIN, although this demands a certain amount of mental acuity from the user.

Other embodiments may provide different output facilities instead of a display for communicating the challenge to the user. One possibility would be to use an audio interface, such as by providing headphones for a user, that could be supported instead of or in addition to the visual display interface. One advantage of an audio interface is that it would allow blind people to use the approach described herein. (Note that many existing systems that use pass code entry, such as ATMs, are relatively inaccessible to blind people because they cannot read the displayed instructions). In addition, the use of a set of arrow keys, as in FIG. 3, for the input device generally makes it simpler for blind people to enter their pass code, compared to the use of a full numeric keypad in existing systems. (It will be appreciated that the arrow keys can be provided with some suitable relief to allow them to be distinguished from one another).

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A method of accepting a pass code, comprising:
providing a user with a machine-generated challenge; and
receiving, from a user-input device, user input which represents a transformation of the machine-generated challenge into a pass code allocated to the user, wherein the user input is dependent on the machine-generated challenge such that the user input is different for different machine-generated challenges;
generating a response from the user input received from the user input device, wherein the user input does not include the pass code itself; and
transmitting the response to a remote authorisation unit to authenticate the response without transmitting the pass code to the remote authorisation unit and without generating the pass code from the user input prior to said transmitting, wherein said response allows the user to be validated at the remote authorisation unit dependent on said response compared to a predicted response based on knowledge of the challenge and a stored data record of the pass code.

2. The method of claim 1, wherein said challenge is independent of said pass code.

3. The method of claim 1, further comprising generating a new challenge for each user validation.

4. The method of claim 3, wherein said challenge is generated on a random basis.

5. The method of claim 3, wherein the challenge is generated in response to receiving a request from a user for validation.

6. The method of claim 1, wherein providing a user with a challenge comprises displaying the challenge to the user.

7. The method of claim 6, wherein the challenge is displayed to the user in such a manner as to prevent third parties from viewing the challenge.

8. The method of claim 1, wherein the user input from the user-input device is received as a set of one or more modifications to be applied to the challenge so that it matches the pass code allocated to the user.

9. The method of claim 8, wherein said set of one or more modifications is received as directional input from the user.

10. The method of claim 9, wherein said directional input is received as the result of the user pressing one or more arrow keys that increment or decrement the challenge by a fixed amount.

11. The method of claim 1, wherein said challenge has the same number of characters as the pass code allocated to the user.

12. The method of claim 11, wherein said transformation is specified individually for each character of the challenge.

13. The method of claim 12, further comprising receiving an indication from the user that the transformation for a different character is about to be entered.

14. The method of claim 1, further comprising receiving an indication from the user that the user input to transform the challenge has been completely entered.

15. The method of claim 1, further comprising generating a pass code from the challenge and from the response.

16. The method of claim 15, wherein the response is validated by comparing the generated pass code with the stored data record of the pass code.

17. The method of claim 1, further comprising:
receiving a communications challenge from the remote authorisation unit that has access to said stored data record of the pass code;
using the response to encrypt said communications challenge; and
transmitting the encrypted communications challenge to the remote authorisation unit;
thereby allowing the response to be validated by said remote authorisation unit using said stored data record of, the pass code.

18. A terminal for use in accepting a pass code, comprising:
- an output for providing a user with a machine-generated challenge; and
- a user-input device for receiving user input which represents a transformation of the machine-generated challenge into a pass code allocated to the user, wherein the user input is dependent on the machine-generated challenge such that the user input is different for different machine-generated challenges;
- wherein said terminal is further configured to:
  - generate a response from the user input received from the user input device, wherein the user input does not include the pass code itself; and
  - transmit the response to a remote authorisation unit to authenticate the response, wherein the response is transmitted without the pass code and without the terminal generating the pass code from the response prior to transmitting, wherein said response allows the user to be validated at the remote authorisation unit dependent on said response compared to a predicted response based on knowledge of the challenge and a stored data record of the pass code.

19. The terminal of claim 18, wherein said challenge is independent of said pass code.

20. The terminal of claim 18, wherein a new challenge is generated for each user validation.

21. The terminal of claim 20, wherein said challenge is generated on a random basis.

22. The terminal of claim 20, wherein the challenge is generated in response to receiving a request from a user for validation.

23. The terminal of claim 18, further comprising a display, wherein the challenge is provided to the user on the display.

24. The terminal of claim 23, wherein the terminal is configured to prevent parties other than the user from viewing the challenge on the display.

25. The terminal of claim 18, wherein the user input from the user-input device is received as a set of one or more modifications to be applied to the challenge so that it matches the pass code allocated to the user.

26. The terminal of claim 25, wherein said set of one or more modifications is received as directional input from the user.

27. The terminal of claim 26, wherein the user-input device comprises one or more arrow keys that increment or decrement the challenge by a fixed amount.

28. The terminal of claim 18, wherein said challenge has the same number of characters as the pass code allocated to the user.

29. The terminal of claim 28, wherein said transformation is specified individually for each character of the challenge.

30. The terminal of claim 29, wherein the user-input device comprises a key for receiving an indication from the user that the transformation for a different character is about to be entered.

31. The terminal of claim 18, wherein the user-input device comprises a key for receiving an indication from the user that the user input to transform the challenge has been completely entered.

32. The terminal of claim 18, wherein the pass code is generated from the challenge and from the user input from the user-input device.

33. The terminal of claim 32, wherein the user is validated by comparing the generated pass code with a stored data record of the pass code.

34. The terminal of claim 18, further comprising a communications link with the remote authorisation unit that has access to a stored data record of the pass code, wherein the terminal receives a communications challenge from said remote authorisation unit and uses a response generated from the user input to encrypt said communications challenge, and wherein the encrypted communications challenge is transmitted to the remote authorisation unit, thereby allowing the response to be validated by said remote authorisation unit against said stored data record of the pass code.

35. An apparatus, comprising:
- means for providing a user with a machine-generated challenge;
- means for receiving user input which represents a transformation of the machine-generated challenge into a pass code allocated to the user, wherein the user input is dependent on the machine-generated challenge such that the user input is different for different machine-generated challenges;
- means for generating a response from the user input received from the user input device, wherein the user input does not include the pass code itself; and
- means for transmitting the response to a remote authorisation unit to authenticate the response without transmitting the pass code to the remote authorisation unit and without generating the pass code from the user input prior to said transmitting.

36. A method for using a pass code to validate a user, comprising:
- receiving a request from a user for validation;
- generating a challenge in response to said request;
- providing the user with the challenge;
- receiving, from a user-input device, user input which represents a transformation of the challenge into a pass code allocated to the user, wherein the user input is dependent on the challenge such that the user input is different for different challenges;
- generating a response from the user input received from the user input device, wherein the response is not the pass code, and wherein the user input does not include the pass code itself;
- generating a predicted response based on knowledge of the challenge and a stored version of the pass code; and
- validating the user on the basis of said response compared to the predicted response, wherein neither the response nor the predicted response is the pass code.

37. A computer program product comprising instructions encoded on a storage medium, said instructions when loaded into a machine causing the machine:
- to provide a user with a machine-generated challenge; and
- receive, from a user-input device, user input which represents a transformation of the machine-generated challenge into a pass code allocated to the user, wherein the user input is dependent on the machine-generated challenge such that the user input is different for different machine-generated challenges;
- generate a response to the challenge from the user input received from the user input device, wherein the user input does not include the pass code itself; and
- transmitting the response to a remote authorisation unit to authenticate the response, without transmitting the pass code to the remote authorization unit and without generating the pass code from the response prior to said transmitting, wherein said response allows the user to be validated at the remote authorisation unit dependent on said response compared to a predicted response based on knowledge of the challenge and a stored data record of the pass code.

38. The computer program product of claim 37, wherein said challenge is independent of said pass code.

39. The computer program product of claim 37, wherein said instructions further cause the machine to generate a new challenge for each user validation.

40. The computer program product of claim 39, wherein the challenge is generated in response to receiving a request from a user for validation.

41. The of computer program product of claim 39, wherein said challenge is generated on a random basis.

42. The computer program product of claim 37, wherein providing a user with a challenge comprises displaying the challenge to the user.

43. The computer program product of claim 42, wherein the challenge is displayed to the user in such a manner as to prevent third parties from viewing the challenge.

44. The computer program product of claim 37, wherein the user input from the user-input device is received as a set of one or more modifications to be applied to the challenge so that it matches the pass code allocated to the user.

45. The computer program product of claim 44, wherein said set of one or more modifications is received as directional input from the user.

46. The computer program product of claim 45, wherein said directional input is received as the result of the user pressing one or more arrow keys that increment or decrement the challenge by a fixed amount.

47. The computer program product of claim 37, wherein said challenge has the same number of characters as the pass code allocated to the user.

48. The computer program product of claim 47, wherein said transformation is specified individually for each character of the challenge.

49. The computer program product of claim 48, wherein said instructions further cause the machine to receive an indication from the user-input device that the transformation for a different character is about to be entered.

50. The computer program product of claim 37, wherein said instructions further cause the machine to receive an indication from the user that the user input to transform the challenge has been completely entered.

51. The computer program product of claim 37, wherein said instructions further cause the machine to generate the pass code from the challenge and from the user input from the user-input device.

52. The computer program product of claim 37, wherein the instructions further cause the machine:
- to receive a communications challenge from the remote authorisation unit that has access to a stored data record of the pass code;
- to use the a response generated from the user input to encrypt said communications challenge; and
- to transmit the encrypted communications challenge to the remote authorisation unit, thereby allowing the response to be validated by said remote authorisation unit using said stored data record of the pass code.

* * * * *